United States Patent
Kobets et al.

(10) Patent No.: US 9,246,891 B1
(45) Date of Patent: Jan. 26, 2016

(54) SYSTEM AND METHOD FOR APPLICATION LICENSE MANAGEMENT IN VIRTUAL ENVIRONMENTS

(71) Applicant: Parallels IP Holdings GmbH, Schaffhausen (CH)

(72) Inventors: Alexey Kobets, Moscow (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 56 days.

(21) Appl. No.: 14/302,111

(22) Filed: Jun. 11, 2014

Related U.S. Application Data (62) Division of application No. 13/705,221, filed on Dec. 5, 2012, now Pat. No. 8,763,159.

(51) Int. Cl.
   *G06F 21/12* (2013.01)
   *H04L 29/06* (2006.01)

(52) U.S. Cl.
   CPC ............ *H04L 63/0478* (2013.01); *G06F 21/12* (2013.01)

(58) Field of Classification Search
   None
   See application file for complete search history.

(56) References Cited

U.S. PATENT DOCUMENTS

| | | | |
|---|---|---|---|
| 2005/0091544 A1* | 4/2005 | Lambert | G06F 21/6218 726/19 |
| 2012/0215662 A1* | 8/2012 | Ito | G06F 21/10 705/26.61 |
| 2012/0216269 A1* | 8/2012 | Yeung | G06F 21/10 726/11 |
| 2012/0331528 A1* | 12/2012 | Fu | H04L 67/10 726/4 |
| 2013/0024681 A1* | 1/2013 | Gattegno | G06F 8/63 713/2 |
| 2013/0086652 A1* | 4/2013 | Kavantzas | G06F 21/335 726/5 |
| 2014/0020107 A1* | 1/2014 | Dodgson | G06F 21/105 726/26 |

* cited by examiner

*Primary Examiner* — Harunur Rashid
*Assistant Examiner* — Andrew Steinle
(74) *Attorney, Agent, or Firm* — Bardmesser Law Group (57) ABSTRACT

A system and method for managing licensing of virtual environment applications. A licensing module of a first installed virtual environment application detects installation of affiliated applications and gives them a group licensing key for passing it to the licensing server. The licensing server derives licensing parameters of the affiliated applications from the group key and gives the licenses to the affiliated applications, in case of successful validation. The licensing system provides protection from un-authorized copying of the applications. If an affiliated virtual environment application is copied (or moved) to another hardware node without its virtual environment, the licensing server will not give the license activation key to this virtual environment application.

20 Claims, 6 Drawing Sheets

SYSTEM AND METHOD FOR APPLICATION LICENSE MANAGEMENT IN VIRTUAL ENVIRONMENTS

CROSS-REFERENCE TO RELATED APPLICATIONS

This application is a divisional of U.S. patent application Ser. No. 13/705,221, filed on Dec. 5, 2012, which is incorporated herein by reference.

BACKGROUND OF THE INVENTION

1. Field of the Invention

This invention relates to a method and system for application license identification and management in virtual environments, and more particularly to identification of licenses of affiliated applications.

2. Description of the Related Art

Virtualization in computer systems presents some challenges with regard to licensing of the applications running within virtual environments, such as containers. Each container can have its own container license key and several container applications each having their own license keys. Managing all these licenses can present some problems.

Conventional licensing schemes for proprietary applications are simple—one license is given to one copy of the application. Typically, the license is granted based on a key provided to an application consumer by a vendor. The license key can be in a form of an alpha-numeric identifier or a product serial number. Some software vendors provide a line of related software products. These vendors, typically, provide a license for several different software products (applications).

For example, Nero™ gives one group license to a set of applications. Similarly, the MICROSOFT Office™, ADOBE Creative Suite and others allow installation of a variety of their applications included into a group package. However, all of the applications have to be purchased together, as a group package. In these cases, a host holds a license data for several software products.

Conventional licensing schemes are not flexible and can be inconvenient for the hosting providers, where application installations are implemented dynamically (on-the-fly) using different scenarios. For example, some container applications have a licensing key activated only for one month. Every month, a licensing module sends a validation request to a central licensing server for checking the validity of the application manager, as well as the validity of the applications.

The licensing server checks an account balance and provides a new license to the application, if the account balance has sufficient funds in it. If the described licensing scheme were to be implemented using "one application—one license" principle, the license validation would have become a very large complex task in cases when a host server has thousands of hosting clients, each having tens of licensed applications installed in their virtual environments.

In this case, the host server would have to check licenses of each of the virtual environments (and the licenses of the application installed) manually in the container one at a time. If the described licensing scheme were to be implemented using "an application package—one license" principle, it would have been impossible to provide flexible distribution of applications on the clients considering different configurations of the applications required for the different clients. This can be partially addressed by a Master License system that provides mass licensing of the grouped applications. However, the Master License system does not work well with the virtual environments. The Master License is tied to an IP range. According to the Master License system, the keys for instances of a licensed product are generated based on the key of the original product.

Thus, an automated and simplified approach to mass licensing in virtual environments is needed. Accordingly, there is a need for a system and method for implementing a licensing system, which automatically gives licenses to second copies of the container applications using the licenses of the original applications (i.e., cloning the virtual environment applications).

SUMMARY OF THE INVENTION

Accordingly, the present invention is related to a system, method and a computer program product for managing licenses of virtual environment applications that substantially obviates one or more of the disadvantages of the related art.

A licensing module of a first installed container application detects installation of affiliated applications and gives them a group licensing key for passing it to the licensing server. The licensing server derives licensing parameters of the affiliated applications from the group key and gives the licenses to the affiliated applications, in case of successful validation. According to an exemplary embodiment, a licensing scheme uses license parameters for different classes of applications.

According to one exemplary embodiment, the licensing system provides protection from un-authorized copying of the applications. For example, if a second (affiliated) container application is copied (or moved) to another hardware node without its container, after a first monthly license check, the licensing server will not give the license activation key to this container application. The licensing server knows that the container ID of this container application has to be affiliated with a group key of the first container application.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to managing application licenses in a virtual environment. In one aspect of the invention, a licensing module of a first installed container application detects installation of affiliated applications and gives them a group licensing key for passing it to the licensing server. The licensing server derives licensing parameters of the affiliated applications from the group key and gives the licenses to the affiliated applications in case of a successful validation. According to an exemplary embodiment, a licensing scheme uses license parameters for different classes of the applications.

According to the exemplary embodiment, the containers are isolated partitions implemented on a single physical server and OS instance to utilize hardware, software, data center and management means with a maximum efficiency. The basic container system capabilities are:

- an intelligent partitioning—division of a server into as many as hundreds of containers with a full server functionality;
- a complete isolation—containers are secure and have full functional, fault and performance isolation;
- a dynamic resource allocation—CPU, memory, network, disk and I/O can be changed without rebooting;
- a global management—suite of tools and templates for automated, multi-container and multi-server administration.

According to the exemplary embodiment, the virtualization model is streamlined for the best performance, management, and efficiency. At the base of the system resides a standard host operating system (OS) which can be, for example, either MICROSOFT WINDOWS or LINUX. Next is the virtualization layer with a proprietary file system and a kernel service abstraction layer that ensure the isolation and security of resources between different containers.

The virtualization layer makes each container appear as a standalone server. Finally, the container itself houses the container/virtual environment applications or workload. According to the exemplary embodiment, a group administrator of the containers is implemented. The containers of one hardware node can have common memory areas isolated according to virtualization principles.

At a first installation of an application in the container (or during a monthly check), the licensing module sends an API request ioctl (dev, VZLINKCTL_SEND, &sb) to a hardware node (i.e., a corresponding container) via a special tunnel vzlink created for input and output of files. The ioctl( ) is a system call function, which changes basic parameters of the devices represented as a special file. The ioctl( ) function has three arguments: a file descriptor corresponding to the device file, an action execution argument and a free argument (used for storing a license marker in the exemplary embodiment). Note that the "sb" is a structure that holds parameters for the specified ioctl. The parameters include:

- a service number;
- a container number (i.e., a number of the container/virtual environment that will serve the request, for example, a container node); and
- descriptors of the communication pipe used for request/replies.

The request includes a marker of a licensing system that is common for the licensing module and for the licensing server. The marker is a service number (e.g., 0 or 1). The request also includes the licensing module ID. Additionally, the request includes a randomly generated prefix for a session identification in an XML format:
<key_required><session_id>XXXXX</session_id></key_required>

The host checks the marker and encrypts the request by a key K:

K=Secret Key together with the session ID, using (for example) 3-DES (Data Encryption Standard) algorithm, or other symmetric encryption algorithms, such as, for example, AES, DES, Blowfish, IDEA, SAFER, XTEA, etc.

The Secret Key is a part of both applications. The Secret Key is embedded into the applications at creation for encryption/decryption of messages between the affiliated applications. The Secret Key is used for additional validation of affiliation and for protection. The first application needs to make sure that it is contacted by an authorized second application. According to the exemplary embodiment, the encrypted message with the added ID of the first application is returned to the second application. The second application decrypts the message using K=Secret Key together with the session ID and transfers the message over to the central license server (Key Administrator) for checking the license.

Note that the message is encrypted for protection in case of interception and for authentication of the central license server. An asymmetric key pair (private/public keys) is used for encryption/decryption. The server checks the affiliation of the first and the second applications and also checks if the license term of the second application has not expired. The server also checks if a number of already installed second applications in this container does not exceed an allowed number.

If all checks are successful, the Key Administrator sends a license key to the second application, which can now work for a month (or other pre-defined period). According to the exemplary embodiment, a licensing scheme of the container manager (controlling all containers) knows the licensing scheme of each container application. The container manager participates in license validity checks at a first installation of a container application and at a monthly license checks.

The license is considered to be valid, if the license term has not expired (can be extended by payment) and, if resource limits allocated for the container application are not exceeded. Resources used by each container application can have common parameters, such as operating memory and a processor time, as well as specific resource-related parameters. For example, for the container manager application, these parameters can be a number of the containers and a number of control panels in each of the containers. The key administrator knows quotas for issued keys set by vendors. For the control panel application, these specific parameters are, for example, a number of sites being served or a number of email boxes on each site, a number of saved files, the size of all saved files, a number of database customers, etc.

Note that the proposed licensing system provides for flexible, reliable and light process of validation and granting a license to the container application included into a package (or an affiliation program). According to one exemplary embodiment, the licensing system provides protection from un-authorized copying of the applications. For example, if a second container application is copied (or moved) to another hardware node without its container, after the first monthly license check, the Key Administrator will not give the license activation key to this container application. The Key Administrator knows that the container ID of this container application has to be affiliated with a group key of the first container application.

Note that, unlike the Master License system, the proposed embodiment connects applications based on the ID of the affiliated first application installed on the hardware node. Additionally, different types of applications can be authorized using the same license key. According to the exemplary embodiment, an automated system for an authorized application cloning is implemented. In other words, cloning does not need to be performed manually for each iteration of the application.

An application requests a license from the Key Administrator. The Key Administrator performs checks for granting a license. The applications can be connected by an IP address, a domain or a hardware node identifier. Thus, the installation site computer's IP address has to be within the specified IP range. Alternatively, a domain name (where the request is originated) or an ID of the hardware node need to be checked for coinciding with the identifier of the first application (for example, of the container manager).

If the checks are successful, the Key Administrator sends a new license activation key with a new Update Password to the application. The Update Password is needed for cloning. According to the exemplary embodiment, the Update Password consists of two portions—a static portion and a dynamic portion. The static portion remains unchanged from one update to another. The dynamic portion is randomly generated and encrypted at each update. The static portion contains hardware node-related data and is used for solving the disputes. The dynamic portion is used against an un-authorized copying.

According to the exemplary embodiment, the Update Password is used as a cloning identifier. The Update Password is represented by an alpha-numeric sequence, which is unique for each cloning iteration. Note that the dynamic portion of the Update Password is generated by the Key Administrator on-the fly. The dynamic portion is encrypted after each cloning. The static portion of the Update Password is not encrypted. It is used for recognition of the key. In other words, the static portion of the Update Password is used for answering the question "Is the Update Password created for the correct key?"

According to the exemplary embodiment, the Update Password is periodically discarded on the Key Administrator (for example, once in six months). Then, if an application is launched from a very old backup, the static portion of an old Update Password allows for making a decision as for validity of the hardware node key.

According to yet another exemplary embodiment, a group license key is given to a first application (or a container manager). The group license key is added into a message by a second application (or a container application). The message is sent to the license server. Based on the message, the license server determines whether to give a license (or what license) to the first application.

The group license key consists of an identifier (a serial number or an ID) and a set of licensing parameters (installation quotas and resource usage limits). According to the exemplary embodiment, only the identifier of the group license key is sent to the license server for authentication. When the group license key is given to the first application, it means that the licensing parameters are transferred to the application.

The proposed innovative licensing system allows, in some embodiments, to store settings license only at the remote Key Administrator and not to depend on the hardware node. If it is necessary to check the license application, the license daemon turns in this case directly to the Key Administrator.

The system, in accordance with the exemplary embodiment, uses a shared memory, which can be simultaneously accessed by multiple programs in order to provide communication between them or to avoid redundant copies. The shared memory is an efficient means of passing data between the applications. When a license is placed into the shared memory, the user space verifies the license and sends a message to the OS kernel (if the verification is successful). The kernel space registers a user space daemon, which periodically sends messages to the kernel in order to start the container. If binary blocks of the shared memory change or the daemon crashes, the kernel does not allow the container to launch.

Figure 1:
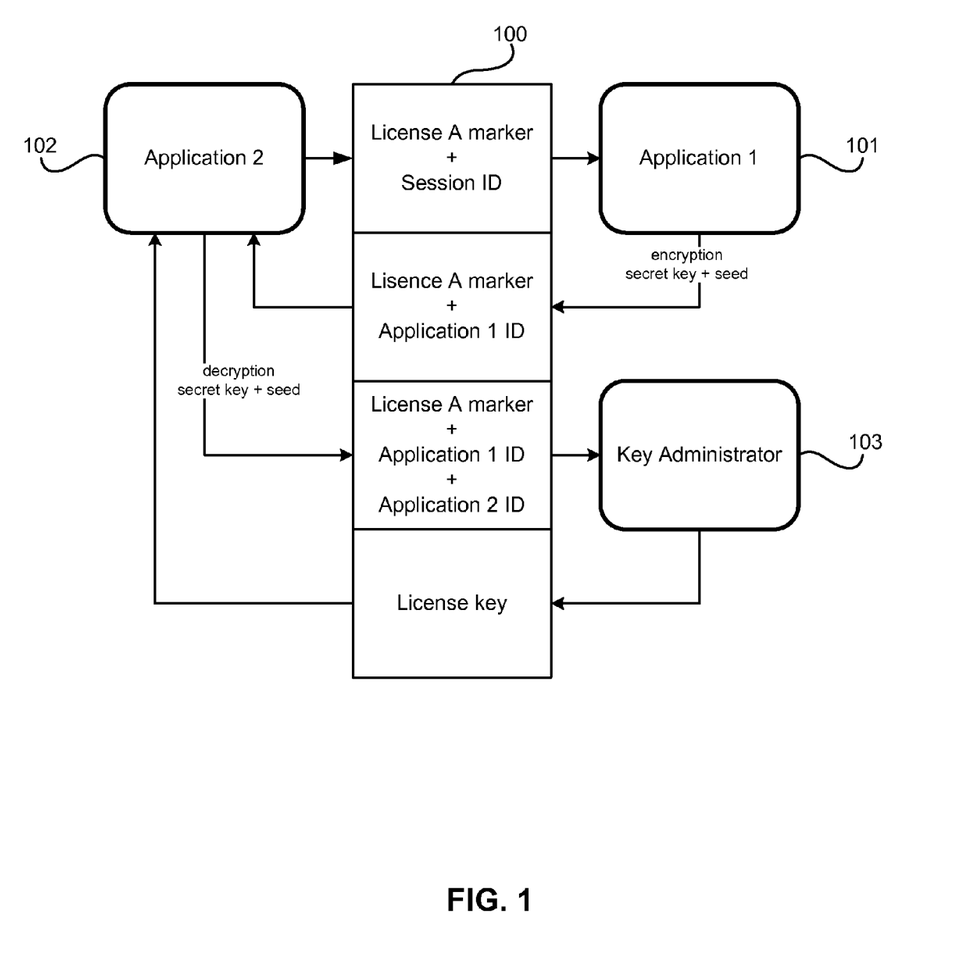
FIG. 1 illustrates a cycle of data in a licensing system, in accordance with the exemplary embodiment.

FIG. 1 illustrates a cycle of data in a licensing system, in accordance with the exemplary embodiment. A messages 100 illustrates data relevant for licensing process. The messages 100 can contain some other data. Application 101 is the first container application installed on a hardware node. The application 101 is used for a licensing scheme A. The ID of the application 101 serves as a group licensing key.

An application 102 is a container application installed on the hardware node after the application 101. The application 102 also complies with the licensing scheme A. A Key Administrator 103 is a server used for checking and granting licenses. The Key Administrator 103 determines if the application 102 can be activated according to the license A on the hardware node where the affiliated application 101 has been already installed. The Key Administrator 103 also determines the parameters (quotas) for granting the application 102 with a license activation key. Note that data from the application 101 is encrypted prior to being placed into the message 100 and decrypted for use in the application 102.

Figure 2:
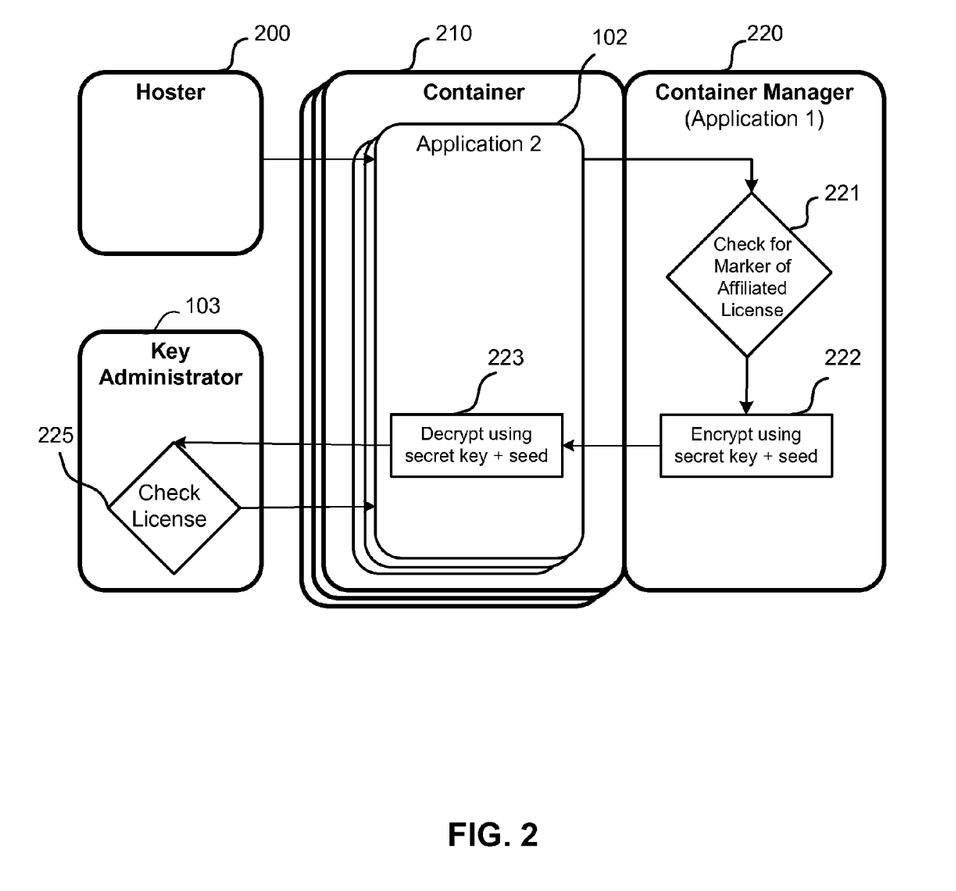
FIG. 2 illustrates architecture of a licensing system, in accordance with the exemplary embodiment.

FIG. 2 illustrates architecture of a licensing system, in accordance with the exemplary embodiment. A hoster 200 places a new application 102 into a container 210. The container application 102 has the same licensing scheme as a container manager 220 (application 1) configured for receiving messages within the container 210. The application 102 sends a request for installation permission to the container manager 220. The request includes a marker of a licensing scheme. Additionally, the request contains a session ID (a randomly generated number, i.e., a seed), which is not required but can be used for security.

The container manager 220 checks the licensing scheme marker (block 221) of the new application 102. If verification is successful, the request is encrypted by a key K=Secret Key together with the session ID. Subsequently, the hoster 200 sends the encrypted response to the application 102. The response contains a license key of the application 1.

According to the exemplary embodiment, the Secret Key is known to the application 102 and to the container manager 220. The Secret Key can be embedded into the applications by a vendor. If the application 102 is really affiliated (i.e., knows the Secret Key), then the application 102 decrypts the response using the Secret Key and application ID (see block 223) and sends the response to the Key Administrator 103.

The Key Administrator 103 checks an affiliation of the applications 102 and the application 1 by checking that they belong to the same licensing scheme. Then, the Key Administrator 103 checks if a limit (quotas) of applications of a given type is not reached for the container 210. If the quotas are not reached, the Key Administrator 103 sends a license key to the application 102. According to the exemplary embodiment, the quotas are a number of installed instances of applications. For example, a vendor or a key administrator can set a quota of 100 application instances per container. Then, for each instance the key administrator checks for a number of already installed instances, and if this number is below a specified quota, then another application instance is installed.

Figure 3:
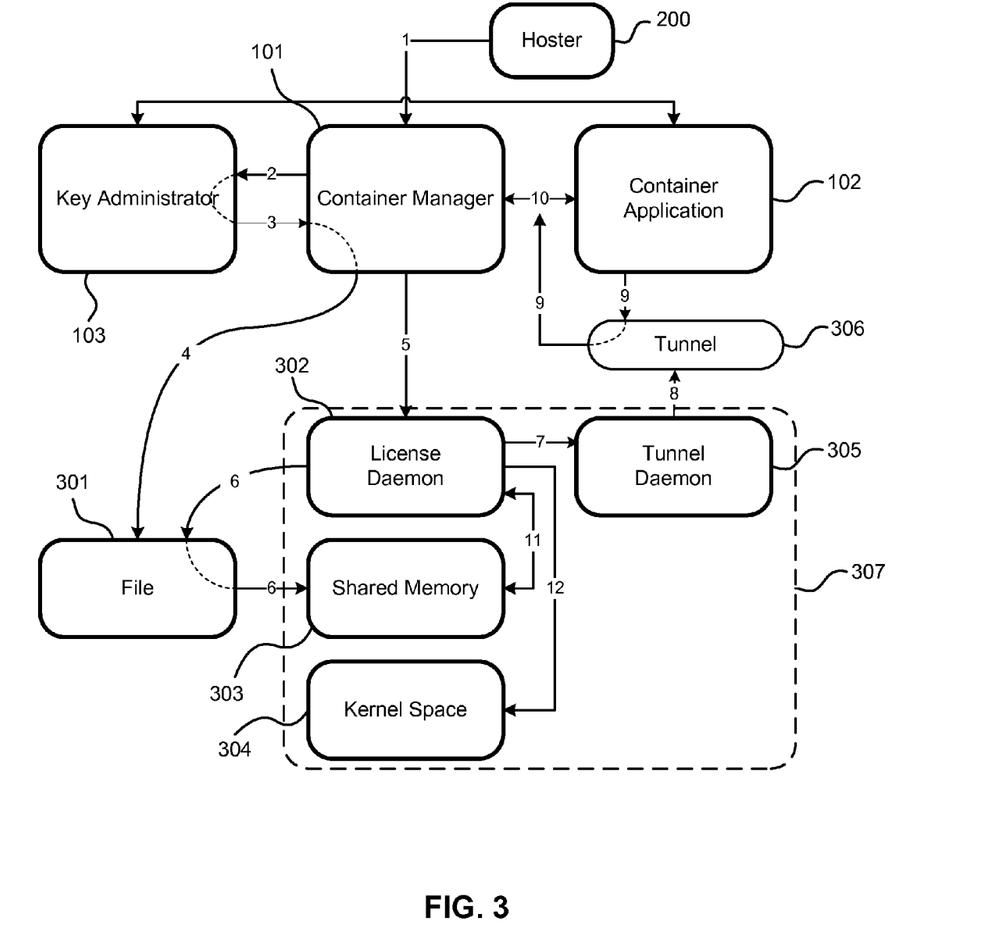
FIG. 3 illustrates a functional diagram of a licensing system, in accordance with the exemplary embodiment.

FIG. 3 illustrates a functional diagram of a licensing system, in accordance with the exemplary embodiment. The container manager application 101 is installed on a hardware node first. The container application 102 is installed into the container of the application 101. The Key Administrator 103 serves as a license server. The hoster 200 installs software (applications) on the hardware node. The parameters of the container manager (application) 101 license received from the Key Administrator 103 are stored in a file 301.

A license daemon 302 monitors compliance with licensing policies of the applications installed on the hardware node in real-time. The license daemon 302 is an application, which is loaded into the memory upon computer system launch. The license daemon 302 check license validity periodically.

A shared memory 303 stores the parameters of the container manager (application) 101 license at a first installation of the container manager on the hardware node and at subsequent installations, when the OS is re-launched. License configurations are copied from the repository into the memory for regular checks by the license daemon 302. The license check frequency by the daemon depends on vendor configurations and on how beginning of the check is defined. The beginning of the check can be connected to processor interrupts or applications events that effect license parameters.

The parameters to be stored in the shared memory 303 are taken from the file 301. A kernel space 304 is a memory area for the needs of the kernel. A license daemon 302 opens a connection tunnel 306 for connecting the container manager 101 with the container application 102. A tunnel daemon 305 is generated by the license daemon 302 for monitoring the messages in the tunnel 306. The tunnel 306 is used for sending messages from the container application 102 to the container manager 101 and for message exchange (10). An operating memory 307 is a RAM.

According to the exemplary embodiment, the tunnel daemon vzlinkmgr provides a communication channel between the applications. The license daemon vzlicdaemon instantiates the vzlinkmgr if the license active parameter is on. Otherwise, the vzlicdaemon stops the vzlinkmgr. The vzlinkmgr starts tunnel application that communicates with the container application.

According to the exemplary embodiment, the hoster 200 installs the container manager 101 (step 1). The container manager 101 requests a group license key form the Key Administrator 103 (step 2). The Key Administrator 103 checks the request data and sends the key (step 3). The container manager 101 saves the key (ID+licensing parameters) into the file 301 (step 4). Then, the container manager 101 launches the license daemon 302 for monitoring license policies (step 5). The license daemon 302 reads the license data from the file 301 and writes the data into the shared memory 303 (step 6).

The license daemon 302 generates the tunnel daemon 305 for setting a connection tunnel between the container manager 101 and the container application 102 (step 7). The daemon 305 creates the tunnel 306 (a special file for I/O)—step 8. Then, the container application 102 sends a request for installation permission (according to the license A) to the container manager 101 over the tunnel 306 (step 9). Subsequently, a pipe is created between the applications (step 10). Note that the standard pipe, which can be used, is a unidirectional channel used for inter-process communications. The standard pipe conforms to, for example, the POSIX.1-2001 protocol.

Thus, an authorized data channel is established between the container manager 101 and the container application 102. Note that this channel is available only to these applications that have been checked by the license marker A (in step 9). Other container applications do not see this data channel. Subsequently, the license daemon 302 periodically (for example, every 30 seconds) checks the state of the license in the shared memory 303 (step 11). The license daemon 302 sends a license verification report to the kernel space 304 (with the same frequency as checking of the license)—step 12.

Figure 4:
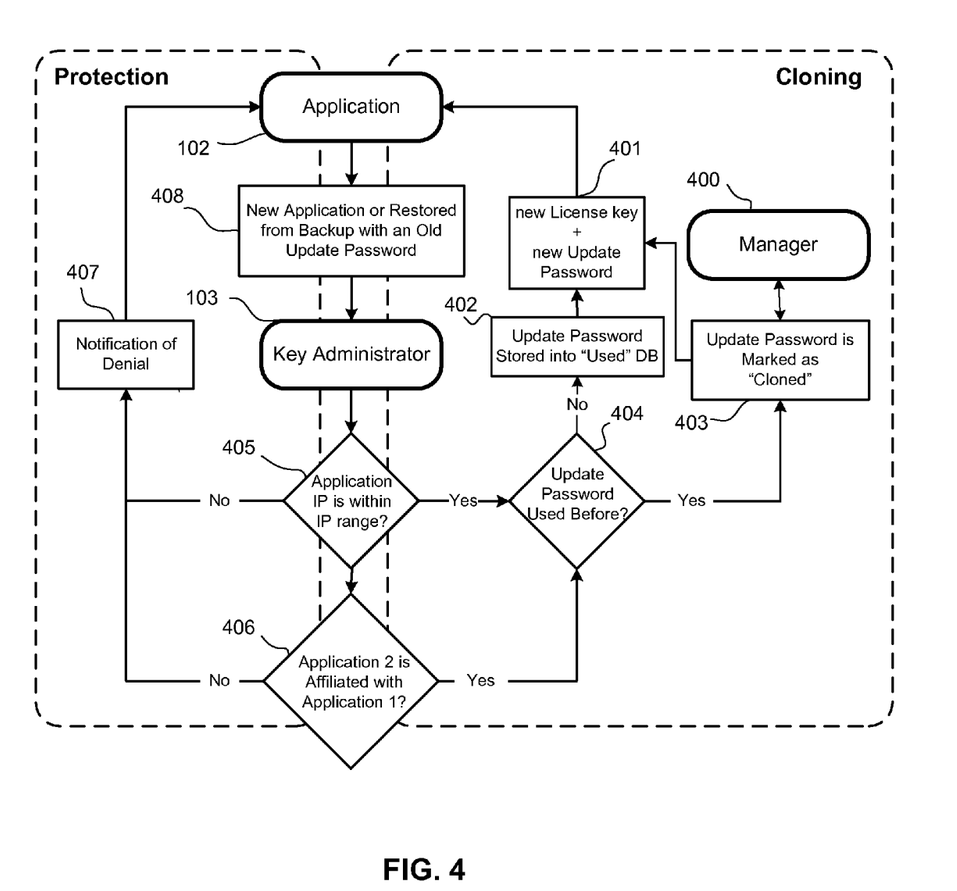
FIG. 4 illustrates a scheme of authorized cloning and protection from piracy, in accordance with the exemplary embodiment.

FIG. 4 illustrates a scheme of authorized cloning and protection from piracy, in accordance with the exemplary embodiment. The application 102 is a container application that needs to receive a license. The Key Administrator 103 serves as a license server for giving licenses to the applications. A manager 400 is an employee of an application vendor. The manager 400 checks all licenses given with a mark Update Password "Cloned" in a post-moderation mode.

The application 102 requests a license from the Key Administrator 103. The Key Administrator 103 performs checks for granting a license. The applications can be connected by an IP address, a domain or a hardware node ID. Thus, the installation site computer's IP has to be within the IP range (see blocks 405). Alternatively, a domain name (where the request is originated) or an ID of the hardware node need to be checked for coinciding with the identifier of the first application (for example, of the Container Manager).

If the checks are successful, the Key Administrator 103 sends a new license activation key with a new Update Password to the application (see block 401). The Update Password is critical for cloning. According to the exemplary embodiment, the Update Password consists of two portions—a static portion and a dynamic portion. The static portion remains unchanged from one update to another. The dynamic portion is randomly generated and encrypted at each update. The static portion contains hardware node-related data and is used for solving the disputes. The dynamic portion is used against un-authorized copying.

According to the exemplary embodiment, the Key Administrator 103 checks if the IP address is within the range (see block 405). However, this step can be optional. The Key Administrator 103 also checks if the application 2 (or a container application) with the given ID is a part of a package with the main affiliated application 1 (or a container manager application) with its own ID (see block 406). The affiliation check can complement or substitute the IP-based check.

If the license key is not granted, a denial notification is sent to the application 102 (see block 407). The Key Administrator 103 checks if the Update Password has been used before (see block 404). If the Update Password has not been used, the Update Password is marked "cloned." Otherwise, the Update Password is stored in a database (see block 402). Note that the application 102 can be a new application or an application restored from a backup with an old Update Password (see block 408).

Figure 5:
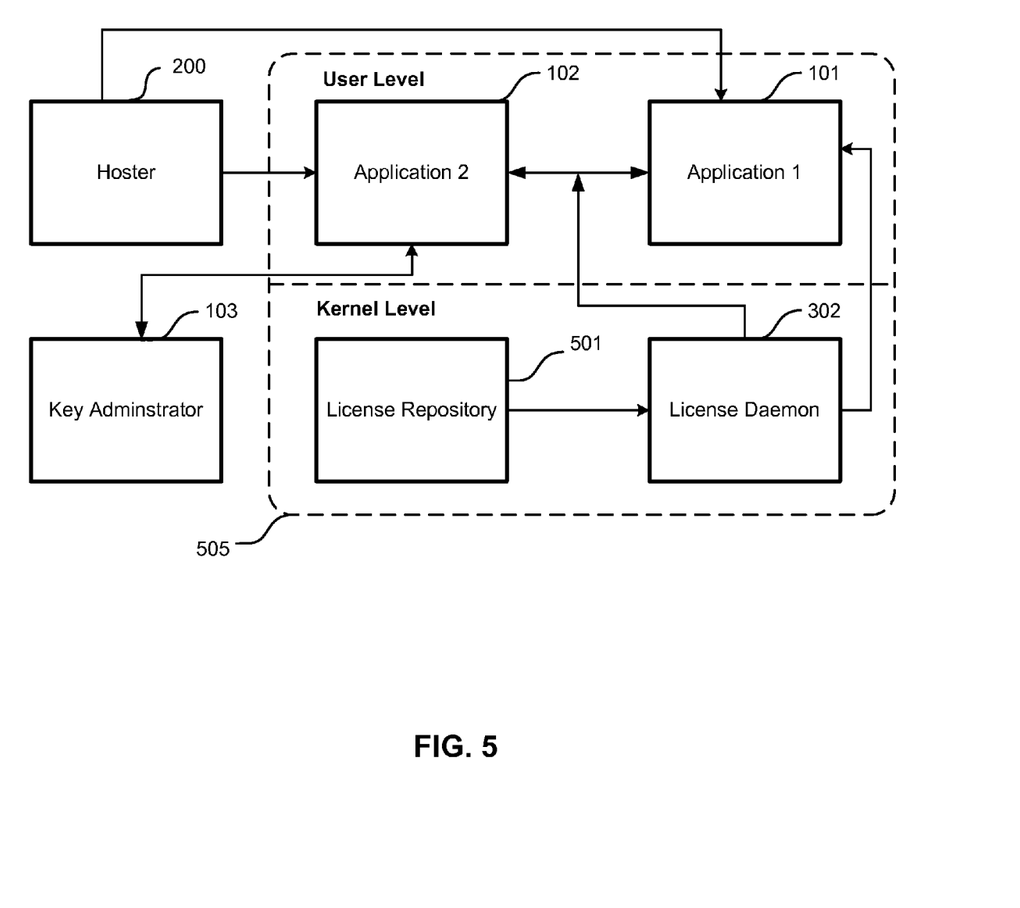
FIG. 5 illustrates a licensing process, in accordance with the exemplary embodiment.

FIG. 5 illustrates a licensing process, in accordance with the exemplary embodiment. The hoster 200 installs the container manger application 101 (application 1) on a hosting server 505. The container manger application 101 uses the licensing scheme A. The container manger can be, for example, Parallels™ Virtuozzo Containers, Microsoft MICROSOFT WINDOWS™ Terminal Services, FreeBSD Jail, UNIX chroot environments, LINUX-VServer, LXC, SOLARIS Containers, IBM AIX6 WPARs, etc.

The license daemon 302 is installed on the hosting server 505. The license daemon 302 stores vendor license parameters in a license repository 501. The license daemon 302 constantly checks application licenses according to the license scheme A. The hoster 200 installs the container application 102 (application 2) onto the hosting server 505. The application 2 can be, for example, a user control panel, a mail client, a text editor, etc.

According to the exemplary embodiment, the applications 101 and 102 are affiliated. This means that they have the same license marker and the same Secret Key (an encryption key used for encryption/decryption of messages between the affiliated applications).

At each re-launch of the hosting server 505 and at the first installation of the application with a license scheme A, the license parameters are copied from the license repository 501 to the operating memory to be checked by the license daemon 302. Frequency of license checks can be defined by developers. Initial check can be set by a timer or by events of the applications 101 and 102.

At its first installation, the container application 102 sends a message to the container manager 101. The message includes the license scheme marker and the session ID. The license scheme marker is passed as a numerical argument of system call ioctl( ). The session ID is a random numerical string generated by the container application 102. The session ID stored in the memory for the duration of the data exchange session between the applications 101 and 102. The session ID is used as an additional message encryption key.

Upon receiving the message from the container application 102, the container manager 101 checks the license scheme marker. If the license marker indicates the same scheme A, the container manager 101 generates a response. The response includes a license scheme marker and the group license key (a numeric or an alpha-numeric sequence).

Note that a group license key can coincide with the container manager 101 ID or with the server ID, or the server IP address depending on the type of linking of the container application 102 to the installation site. The linking types can be, for example:

a link to an application, which owns a group license key;
a link to a container ID;
a link to a container IP address.

According to the exemplary embodiment, the container manager 101 response is encrypted by a symmetric key. The container application 102 decrypts the response and generates a message to the Key Administrator 103. The message includes the A license scheme marker, the group license key and the container application 102 ID. The message is encrypted for protection against interception and for authentication of the Key Administrator 103.

Subsequently, the Key Administrator 103 checks if the applications 101 and 102 belong to the license scheme A. The Key Administrator 103 also checks if the container application 102 is included into the pool of applications allowed to receive licenses by a group license key from the container manager 101. Additionally, the Key Administrator 103 checks if the quota for installation applications of this type is not exceeded. If all of the checks are successful, the Key Administrator 103 sends the license activation key to the container application 102.

According to one exemplary embodiment, the license can be nullified and reproduced on another hardware node. The license is linked to a GUID (IP domain, hardware ID, etc.). This link can be provided to the Key Administrator 103 (for example, by a sales manager). Then, whenever an activation code addresses the Key Administrator, the Key Administrator detect an empty link and creates a new one to an identifier provided by a current instance of the application. However, the client cannot change the links for security reasons.

According to the exemplary embodiment, the licenses are managed and monitored by a Product Key Protocol, which uses the following commands:

get_key( )—derive a key;
is_upgrade_available( )—determines if the upgrade between the versions is available and supported;
report_usage( )—reports how the product is used in a form of an archived file.

Thus, the Product Key Protocol provides for license workflow. The license can be blocked if deemed stolen. Note that the exemplary embodiment can be, advantageously, integrated using Partner API functionality.

Figure 6:
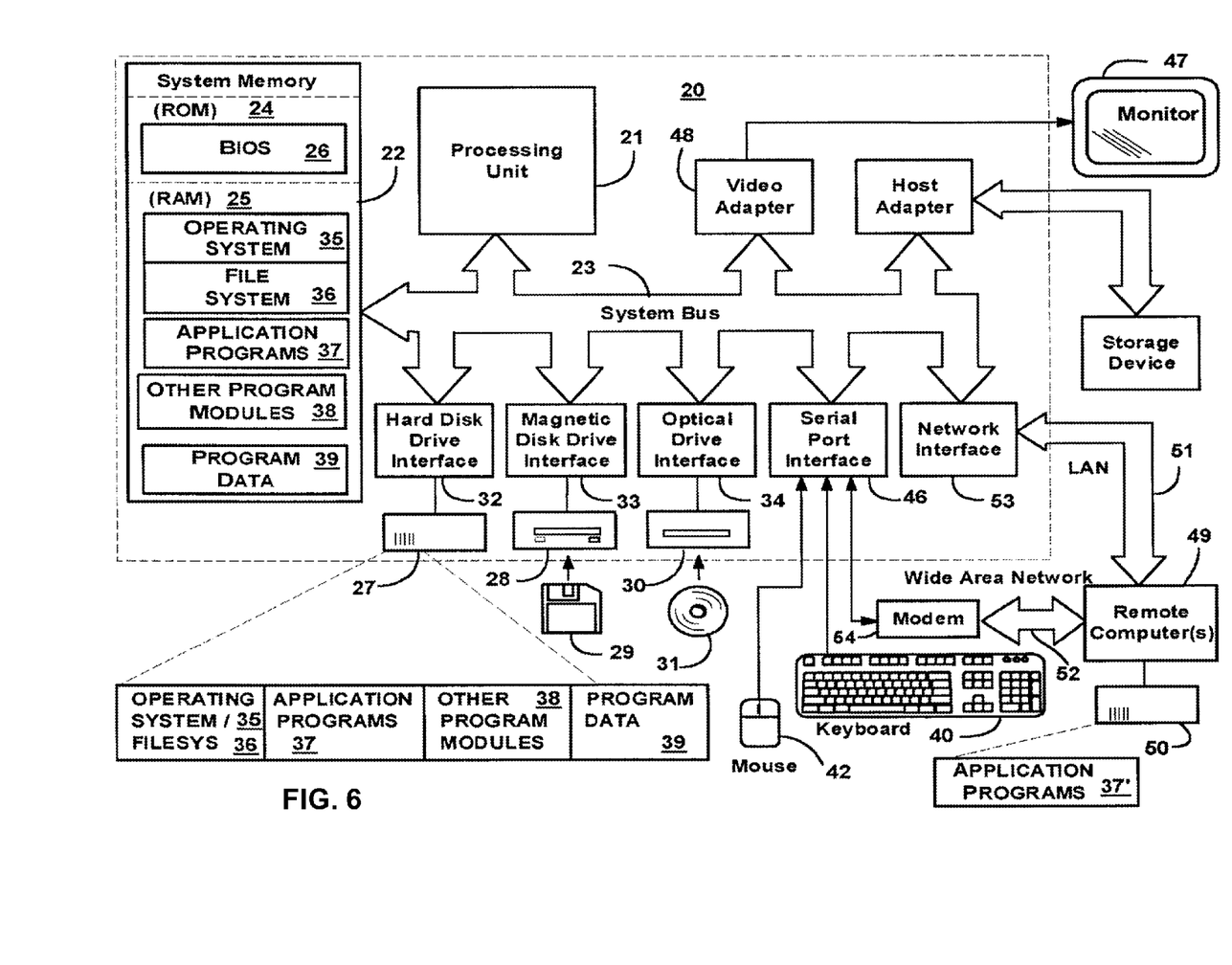
FIG. 6 illustrates an example of a computer or a server on which the invention may be implemented.

With reference to FIG. 6, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT WINDOWS). The computer 20 includes a file system 36 associated with or included within the operating system 35, such as the MICROSOFT WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A computer-implemented method for authorized cloning of virtual environment applications and protection from copying, the method comprising:
    launching an application in a first virtual environment on a first hardware node and creating an application backup,
    wherein the first virtual environment shares a single instance of a host operating system of the first hardware node with other virtual environments of the first hardware node;
    launching the application from the backup in a second virtual environment on a second hardware node,
    wherein the second virtual environment shares a single instance of a host operating system of the second hardware node with other virtual environments of the second hardware node;
    sending an application authorization request to a license server, wherein the request includes an update password and a link identifier;
    checking for the update password in a database of used update passwords;
    marking the update password as "cloned" if the update password is found in the database;
    marking the update password as "used", if the update password is not found in the database;
    generating a new update password and a license key and sending them to the application, wherein the license key is a group license key that licenses both the application and the virtual environment in which the application is running,
    wherein the update password comprises a randomly generated portion; and
    sending a denial notification to the application, if the link identifier is not valid.

2. The method of claim 1, wherein the update password is a unique alpha-numeric sequence.

3. The method of claim 1, wherein the link identifier is any of:
    an IP address;
    a domain identifier;
    an application identifier; and
    a hardware node identifier.

4. The method of claim 3, further comprising, sending a denial notification to the application, if an application identifier is not valid.

5. The method of claim 1, wherein the update password also comprises a static portion.

6. A system for managing licenses in virtual environments, the system comprising:
    a processor;
    a memory coupled to the processor;
    a computer program logic stored in the memory and executed on the processor for implementing the steps of:
    launching an application in a first virtual environment on a first hardware node and creating an application backup,
    wherein the first virtual environment shares a single instance of a host operating system of the first hardware node with other virtual environments of the first hardware node;
    launching the application from the backup in a second virtual environment on a second hardware node,
    wherein the second virtual environment shares a single instance of a host operating system of the second hardware node with other virtual environments of the second hardware node;
    sending an application authorization request to a license server, wherein the request includes an update password and a link identifier;
    checking for the update password in a database of used update passwords;
    marking the update password as "cloned" if the update password is found in the database;
    marking the update password as "used", if the update password is not found in the database;
    generating a new update password and a license key and sending them to the application, wherein the license key is a group license key that licenses both the application and the virtual environment in which the application is running,
    wherein the update password comprises a randomly generated portion; and
    sending a denial notification to the application, if the link identifier is not valid.

7. The method of claim 1, wherein the second application has the same licensing scheme as the first application.

8. The method of claim 7, wherein the request includes a marker of the licensing scheme and a session identifier.

9. The method of claim 8, further comprising
creating a secure tunnel between the first application and the second application;
sending the request to the first application over the tunnel;
generating a message containing the group license key, if the marker of the licensing scheme of the second application coincides with that of the first application;
encrypting the message with a secret key;
sending the message to the second application over the tunnel;
decrypting the message and adding an identifier of the second application to the message;
sending the message to a licensing server;
receiving a license activation key from the licensing server, if the licensing server validates the message; and
activating a license of the second application with the license key,
wherein the secret key includes the session identifier.

10. The method of claim 9, wherein the first and the second applications have the same secret key.

11. The method of claim 9, wherein the session identifier is a randomly generated number.

12. The method of claim 9, wherein the first application and the second application are affiliated by the same marker.

13. The method of claim 9, wherein a user space daemon checks the group license key and launches a user space daemon, which sends a notification to a kernel space daemon.

14. The method of claim 13, wherein the user space daemon creates the secure tunnel between the first application and the second application upon detecting the marker.

15. The method of claim 9, wherein the group license key is an identifier of the virtual environment manager.

16. The method of claim 1, wherein license settings are stored only at a remote key administrator and do not depend on hardware on which the license is installed.

17. The method of claim 1, wherein the license marker contains an argument of a ioctl( ) function.

18. The method of claim 1, wherein the license server checks an installation quota for the second application prior to sending the activation key, wherein the installation quota is a number of applications of a particular type allowed to be installed on the hardware node.

19. The method of claim 1, wherein the license server checks an affiliation of the first and the second applications based on the same licensing scheme.

20. The method of claim 1, wherein the license server checks if the second application belongs to a pool of applications allowed to receive a group license key.

* * * * *